US006924732B2

(12) United States Patent
Yokoo

(10) Patent No.: US 6,924,732 B2
(45) Date of Patent: Aug. 2, 2005

(54) CAMERA FOR MONITORING UTILIZING POWER LINE COMMUNICATION

(75) Inventor: Kenichi Yokoo, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 158 days.

(21) Appl. No.: 10/662,576

(22) Filed: Sep. 15, 2003

(65) Prior Publication Data
US 2004/0066465 A1 Apr. 8, 2004

(30) Foreign Application Priority Data

Sep. 25, 2002 (JP) ......................................... 2002-279097

(51) Int. Cl.[7] .............................................. H04M 11/04
(52) U.S. Cl. ............... 340/310.01; 340/538; 340/693.2; 340/541; 348/143
(58) Field of Search ........................ 340/310.01–310.08, 340/538, 693.2, 541; 348/143, 150–156

(56) References Cited

U.S. PATENT DOCUMENTS

| 5,583,796 | A | * | 12/1996 | Reese .......................... 702/185 |
| 5,963,255 | A | * | 10/1999 | Anderson et al. ........... 348/372 |
| 6,583,893 | B1 | * | 6/2003 | Satoh et al. ................. 358/402 |
| 6,812,970 | B1 | * | 11/2004 | McBride ...................... 348/372 |
| 2004/0044890 | A1 | * | 3/2004 | Lim et al. ....................... 713/2 |

FOREIGN PATENT DOCUMENTS

| JP | 363152291 A | * | 6/1988 |
| JP | 08-186809 | | 7/1996 |
| JP | 02001024937 A | * | 1/2001 |

* cited by examiner

Primary Examiner—Benjamin C. Lee
(74) Attorney, Agent, or Firm—Brinks Hofer Gilson & Lione

(57) ABSTRACT

A power monitoring section detects the interruption of AC electric power from a power line, and switches operating power within a camera to power from a battery. A control section sets control of the camera to a different mode at the power stopping time. The operation is controlled to pick-up one static image at constant time intervals, and sequentially stores the static image to a data storage section. A voice section stops collecting sounds. The control section stops communication with a master set. When the AC electric power is restored the operating power is switched to the electric power from the power line. When a user utilizing the master set knows the restoration of the power, the user gives commands for reading image information stored during the power stoppage to the camera, and monitors the state during the interruption of the AC electric power.

4 Claims, 3 Drawing Sheets

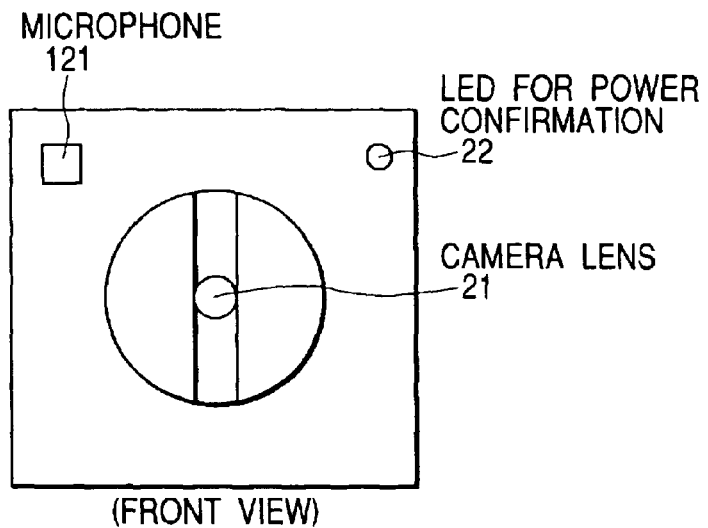
FIG. 2A (FRONT VIEW)
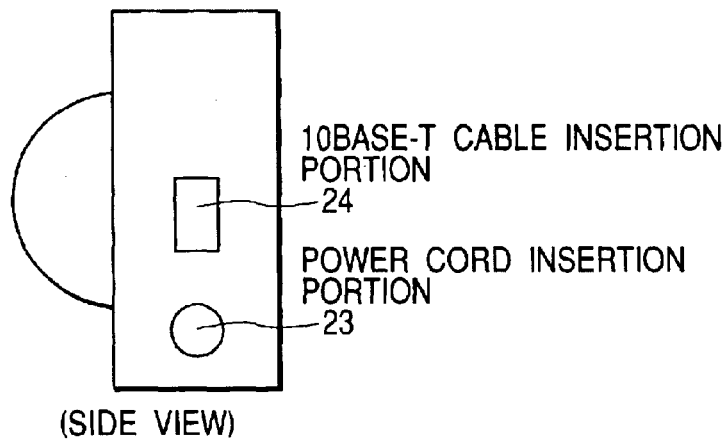
FIG. 2B (SIDE VIEW)
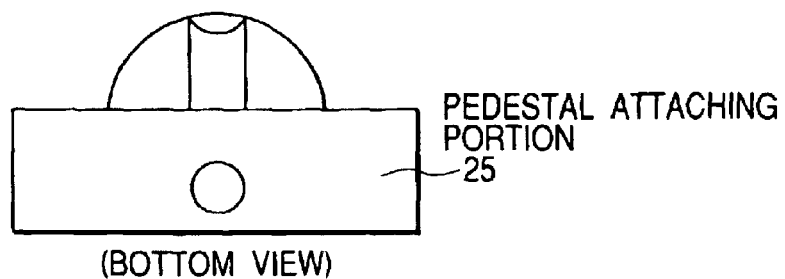
FIG. 2C (BOTTOM VIEW)

CAMERA FOR MONITORING UTILIZING POWER LINE COMMUNICATION

BACKGROUND OF THE INVENTION

1. Field of the Invention

The present invention relates to a camera for monitoring, and particularly relates to the camera for monitoring able to transmit a video signal to a master set by using power line communication (PLC).

2. Description of the Related Art

In recent years, a system having a power line communication function in in-home devices such as various kinds of home electric products, etc. is proposed within a home, etc. In this system, these in-home devices are monitored and controlled from a master set constructed by PC, etc. The above master set is accessed from the exterior through a public communication network. Thus, the in-home devices can be monitored and controlled from the exterior.

FIG. 3 is a view schematically showing the construction of the monitoring control system of the in-home device using the PLC in the prior art. The system of the prior art will next be explained by FIG. 3. In FIG. 3, reference numerals 31 and 32 respectively designate an indoor master set and a camera for monitoring. Reference numerals 33 to 35 designate in-home devices. Reference numerals 36, 37 and 38 respectively designate a PLC modem, a public communication network and a power line.

In the prior art shown in FIG. 3, the indoor master set 31, the camera 32 for monitoring and the in-home devices 33 to 35 are connected to the power line 38, and can be operated by receiving electric power from the power line. The PLC modem 36 is built in the indoor master set 31, or is externally attached to the indoor master set 31 so that the power line communication can be performed. Further, the indoor master set 31 has a function for performing the communication through the public communication network. The PLC modem is built in each of the camera 32 for monitoring and the in-home devices 33 to 35 so that the communication can be performed. For example, each of the in-home devices 33 to 35 may be constructed by a refrigerator, an air conditioner, a television set, a video recorder, etc.

The indoor master set 31 monitors the states of these in-home devices through the power line, and can control the operations of these in-home devices. Further, the indoor master set 31 can display a picture (dynamic image) from the camera 32 for monitoring in a display section, and can make a user see a state of the entrance of a house, etc. Further, the indoor master set 31 can control the photographing direction, the enlargement (e.g., the zooming of a lens) of a photographing range of the camera 32 for monitoring, etc. on the basis of commands of the user.

The indoor master set 31 as a monitoring terminal can communicate with another communication device through the public communication network 37 such as a telephone line, a portable telephone line, the Internet, etc. For example, the user carrying PDA, a portable telephone set, etc. and going out makes connection with the indoor master set 31 from the carried PDA, portable telephone set, etc. Thereafter, similar to the above case, the user can monitor the states of the in-home devices during the user's absence from a going-out place through the indoor master set 31 and can control the operations of these devices. Further, the user can control the operation of the camera 32 for monitoring and can receive a picture from the camera 32 for monitoring.

A technique for controlling the operation of the camera for monitoring and receiving the picture from the camera for monitoring by the power line communication is known as a typical technique of the above prior art (for example, see Patent Literature 1).

[Patent Literature 1]

Japanese Unexamined Published Patent Application No. H8-186809

Devices having the power line communication function are generally operated by the electric power from the power line, and the communication function is also fulfilled by utilizing the electric power from the power line. Therefore, when the supply of the electric power from the power line is interrupted by power stoppage, etc. in these devices, no original functions of the devices can be fulfilled and no power line communication can be also performed. In particular, in the case of the camera for monitoring explained above, when the supply of the electric power is interrupted by the power stoppage, no state of a monitoring area during the power stoppage can be known at all.

SUMMARY OF THE INVENTION

In consideration of the above points, an object of the present invention is to provide a camera for monitoring able to transmit a video signal to the master set by using the power line communication, and able to transmit the state of a monitoring area during the power stoppage to the master set after the power stoppage is restored even when the supply of the electric power is interrupted by the power stoppage.

In accordance with the present invention, the above object is achieved by a camera for monitoring able to transmit a video signal to a master set by using power line communication, and comprising a power control section for switching operating power to power from a secondary battery when the supply of electric power from the power line is monitored and is interrupted; a picture section for picking-up a static image every constant time at the interrupting time of the power line electric power; and a data storage section for storing the static image from the picture section; wherein the static image every constant time stored to the data storage section is transmitted to the master set as a monitoring terminal by using the power line communication when the power line electric power is restored.

The above object is also achieved by the camera for monitoring in which the picture section photographs a dynamic image and the photographed dynamic image is transmitted to the master set as the monitoring terminal when the electric power is supplied from the power line.

BRIEF DESCRIPTION OF THE DRAWINGS

FIG. 2 is a view showing an example of the external appearance of the camera for monitoring in accordance with one embodiment mode of the present invention.

DESCRIPTION OF THE PREFERRED EMBODIMENTS

The embodiment modes of a camera for monitoring in the present invention will be explained in detail by the drawings.

Figure 3:
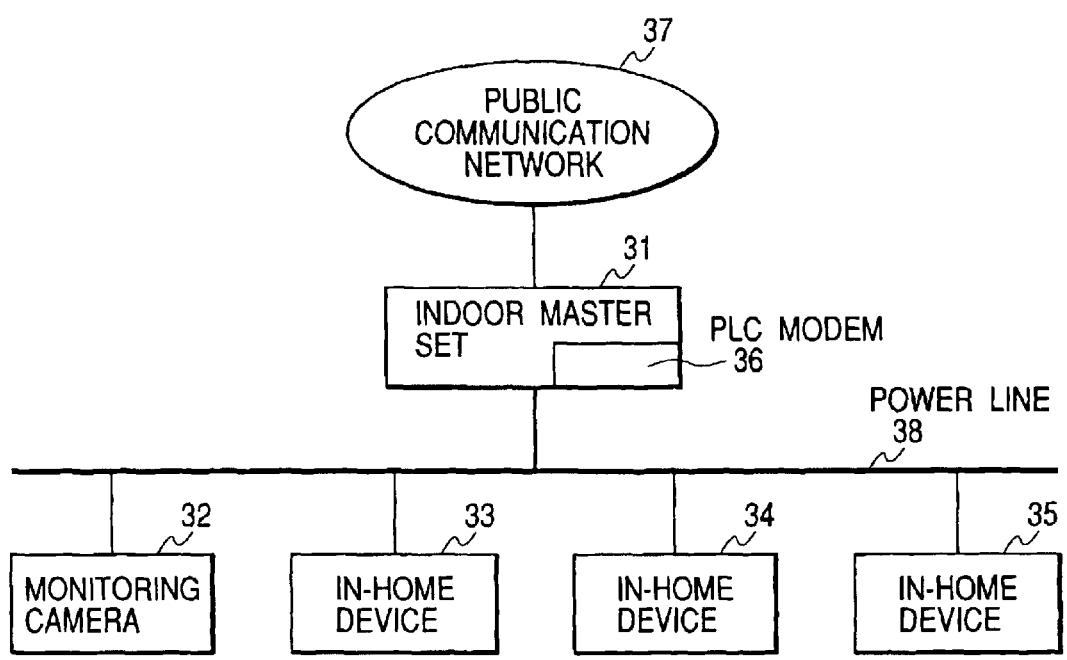
FIG. 3 is a view schematically showing the construction of a monitoring control system of an in-home device using PLC in the prior art.

The construction of a system applying the present invention thereto may be set to the same as the case of the prior art explained by FIG. 3.

Figure 1:
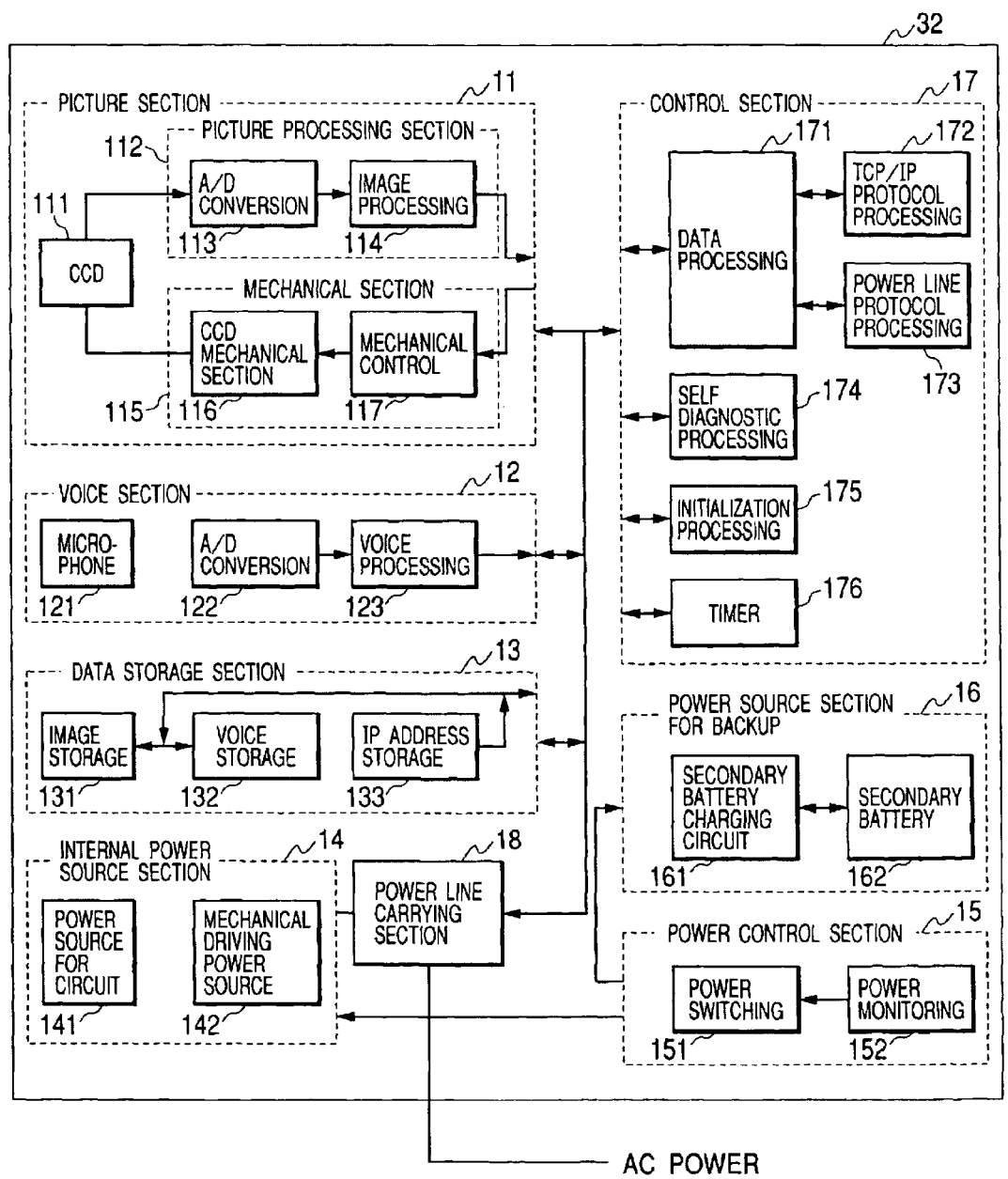
FIG. 1 is a block diagram showing the construction of a camera for monitoring in accordance with one embodiment mode of the present invention.

FIG. 1 is a block diagram showing the construction of a camera for monitoring in accordance with one embodiment mode of the present invention. In FIG. 1, reference numerals 11, 12 and 13 respectively designate a picture section, a voice section and a data storage section. Reference numerals 14, 15 and 16 respectively designate an internal power source section, a power control section and a power source section for backup. Reference numerals 17, 18 and 111 respectively designate a control section, a power line carrying section and a CCD element. Reference numeral 112 designates a picture processing section. Reference numerals 113, 122 designate A/D converting sections. Reference numerals 114, 115 and 116 respectively designate an image processing section, a mechanical section and a CCD mechanical section. Reference numerals 117, 121 and 123 respectively designate a mechanical control section, a microphone and a voice processing section. Reference numerals 131, 132 and 133 respectively designate an image storage section, a voice storage section and an IP address storage section. Reference numerals 141, 142 and 151 respectively designate a power source section for circuits, a mechanical driving power source section and a power switching section. Reference numerals 152, 161 and 162 respectively designate a power monitoring section, a secondary battery charging circuit and a secondary battery. Reference numerals 171, 172 and 173 respectively designate a data processing section, a TCP/IP protocol processing section, and a power line protocol processing section. Reference numerals 174, 175 and 176 respectively designate a self diagnostic processing section, an initialization processing section and a timer.

As shown in FIG. 1, the camera for monitoring in accordance with one embodiment mode of the present invention is constructed by arranging the picture section 11, the voice section 12, the data storage section 13, the internal power source section 14, the power control section 15, the power source section 16 for backup, the control section 17 and the power line carrying section 18. The picture section 11, the voice section 12, the data storage section 13, the control section 17 and the power line carrying section 18 are connected to each other by buses. Required electric power is supplied from the internal power source section 14.

The control section 17 performs the entire control of the illustrated camera for monitoring, the control of the mechanical section and data processing for communication. The control section 17 is constructed by the data processing section 171 connected to the TCP/IP protocol processing section 172 and the power line protocol processing section 173, the self diagnostic processing section 174 for diagnosing each functional section within the camera and the mechanical section, the initialization processing section 175 for initializing the functional section and the mechanical section, and the timer 176. The data processing section 171 is constructed by a microprocessor, etc., and processes communication data by using the TCP/IP protocol processing section 172 and the power line protocol processing section 173. The data processing section 171 also controls the entire operation of the illustrated camera for monitoring.

The picture section 11 is constructed by the CCD element 111, the picture processing section 112 and the mechanical section 115. The CCD element 111 converts a monitoring picture from an unillustrated optical system to an electric signal and outputs the converted electric signal. The picture processing section 112 has the A/D converting section 113 and the image processing section 114, and processes the signal from the CCD element 111. The mechanical section 115 has the CCD mechanical section 116 and the mechanical control section 117, and controls the operation of the mechanical section including the optical system.

The voice section 12 is constructed by the microphone 121 for receiving a voice from a visitor, etc. and a situation sound around the camera, the A/D converting section 122 and the voice processing section 123. The data storage section 13 is constructed by the image storage section 131 for storing image information from the picture section 11, the voice storage section 132 for storing voice information from the voice section 12, and the IP address storage section 133 storing an IP address of the camera for self monitoring.

The power line carrying section 18 receives a control signal sent by a PLC signal from an indoor master set through a power line and transmits the signal to the control section 17, etc. The power line carrying section 18 then performs processing for transmitting the image information and the voice information to the indoor master set as a monitoring terminal similar to that explained in the prior art through the power line. The data processing section 171 in the control section 17 performs the protocol processing of a receiving signal and the protocol processing of a transmitting signal by using the TCP/IP protocol processing section 172 and the power line protocol processing section 173.

The internal power source section 14 is constructed by the power source section 141 for circuits and the mechanical driving power source section 142. The power source section 141 for circuits receives AC electric power from the power line, or receives electric power from a secondary battery at a power stopping time, and supplies the electric power to circuits within the camera. The mechanical driving power source section 142 supplies the electric power for operating the mechanical section to each mechanical section. The power source section 16 for backup is constructed by the secondary battery 162 used at the stopping time of the AC power for a commercial use on the power line, and the secondary battery charging circuit 161 for charging the secondary battery 162 when the AC electric power is received from the power line. The power control section 15 is constructed by the power monitoring section 152 and the power switching section 151. The power monitoring section 152 monitors the stoppage of the AC power for a commercial use on the power line. When the stoppage of the AC power for a commercial use is detected by the power monitoring section 152, the power switching section 151 switches the supply of the power with respect to the internal power source section 14 from the AC power for a commercial use to the secondary battery.

A monitoring operation using the camera for monitoring in the embodiment mode of the present invention constructed as mentioned above will next be explained when the AC electric power is first received from the power line.

When the AC electric power is received from the power line, predetermined required electric power is supplied to all the circuit sections and the mechanical section of the camera for monitoring constructed as mentioned above. Further, the power source section 16 for backup charges the secondary battery 162 by the secondary battery charging circuit 161. The picture section 11 outputs the information of a photographed dynamic image, and the voice section 12 outputs collected voice information. The control section 17 once receives the information of the dynamic image and the voice information. The data processing section 171 performs predetermined protocol processing with respect to the information of the dynamic image and the voice information by using the TCP/IP protocol processing section 172 and the power line protocol processing section 173, and transfers the processed information to the power line carrying section 18. The power line carrying section 18 transmits the received information of the dynamic image and the received voice information to an indoor master set through the power line.

The indoor master set outputs the received dynamic image to a display section, and also outputs the voice from a speaker, etc. Thus, a user utilizing the master set can monitor the situation near the position of the camera for monitoring by the picture and the voice at all times.

In the above description, the information of the dynamic image and the voice information transmitted to the master set may not be stored to the image storage section 131 and the voice storage section 132 within the data storage section 13, but can be also stored for a constant time. Thus, when the user performing the monitoring leaves the user's seat for a short time, the user can monitor the state during the leaving of the seat retroactively to the past by giving commands for reading information stored during this leaving.

Further, for example, when the user wants to change the image pickup direction and the image pickup range of the dynamic image while the user monitors the picture and the voice, the user can transmit a control signal showing these changes to the camera for monitoring by operating the master set. When the camera for monitoring receives this control signal by the power line carrying section 18, this control signal is transmitted to the control section 17. The control section 17 interprets this control signal by the data processing section 171, and makes the mechanical section 115 change the direction of the camera and zoom a lens, etc. Further, when a past record is required in the control information, the control section 17 reads and transmits the image information and the voice information from the data storage section 13 to the master set.

The monitoring operation of the camera for monitoring in the embodiment mode of the present invention will next be explained when the AC electric power is interrupted from the power line and no electric power is received.

When the AC electric power is interrupted from the power line, the power monitoring section 152 within the power control section 15 detects this power interruption, and makes the power switching section 151 switch the operating power within the camera to power from the secondary battery 162. Further, the control section 17 sets the entire control of the camera to a mode at the power stopping time so as to perform the monitoring by minimum electric power. Namely, in this case, the operation of the picture section 11 is controlled such that one static image is picked up for a constant time, e.g., every predetermined time. The picked-up static image is sequentially stored to the data storage section 13. Further, the voice section 12 stops the collecting operation of sounds, and the control section 17 stops the communication with the master set.

As mentioned above, when the AC electric power is interrupted from the power line, the camera for monitoring in the embodiment mode of the present invention basically performs only an operation for picking-up and storing a small number of static images such as e.g., one or a few images in a second, and continues the monitoring in a state in which power consumption is restrained. The photographing frequency of the static image in this case may be suitably determined in accordance with the capacity of the secondary battery 162 and the power consumption of the camera for monitoring required in the operation at the power stopping time. However, the photographing frequency is preferably set to a frequency set to such an extent that the movement of a person can be known to a certain extent when the static image is sequentially read after the power stoppage is restored.

When the AC electric power is restored from the power line, the power control section 15 detects the restoration of the power and switches the operating power to the electric power from the power line. The control section 17 changes the operation of the camera for monitoring to the normal operation at the AC power normal time. Thereafter, when the user utilizing the master set knows the restoration of the power, the user gives commands for reading image information stored during the power stoppage to the camera for monitoring. Thus, the user can monitor the state during the interruption of the AC electric power from the power line retroactively to the past.

FIG. 2 is a view showing an example of the external appearance of the camera for monitoring in accordance with one embodiment mode of the present invention. In the camera for monitoring in the embodiment mode of the present invention, its outer shape is not prescribed, and it is sufficient to have the photographing function of a dynamic image, the photographing function of a static image, a sound collecting function and a power line communication function as explained by FIG. 1. Next, the example of the external appearance will be explained. In FIG. 2, reference numerals 21, 22 and 23 respectively designate a lens, an LED for power confirmation, and a power cord insertion portion. Reference numerals 24 and 25 respectively designate a 10BASE-T cable insertion portion and a pedestal attaching portion.

As shown in the front view of FIG. 2A, the lens 21 for photographing an image is arranged on the front face of the camera for monitoring so as to be projected from a box body constituting the main body. The LED 22 for power confirmation showing the supply of the AC electric power from the power line, and the microphone 121 for collecting sounds are arranged in the upper portion.

As shown by the side view of FIG. 2B, the power cord insertion portion 23 for supplying the AC electric power from the power line and the 10BASE-T cable insertion portion 24 are arranged on the side face of the camera for monitoring. The 10BASE-T cable insertion portion 24 is arranged to connect the camera for monitoring in the present invention to another device in a communication system except for the power line communication. The 10BASE-T cable insertion portion 24 is a portion for inserting a 10BASE-T cable standardized by IEEE802.3.

Further, as shown by the bottom view of FIG. 2C, the pedestal attaching portion 25 is arranged on the bottom face of the camera for monitoring in the embodiment mode of the present invention. The monitoring camera is arranged by this pedestal attaching portion 25 in a predetermined place such as the entrance port of a house, etc. and can transmit the movement of a visitor to the indoor master set as explained by FIG. 1.

As can be seen from FIGS. 2A, 2B and 2C, a hemispherical member covering the circumference of the barrel of the lens 21 is arranged in a front face portion of the camera for monitoring. This hemispherical member protects the lens 21, and is effective to obtain a preferable design of the camera.

In the explanation of the above embodiment mode of the present invention, the present invention is applied to the monitoring of the entrance of a housing, etc. in the monitoring control system of an in-home device using the PLC.

However, for example, the present invention can be also applied to the monitoring of the entrance of a commercial building, the monitoring of an entrance and exit in a factory, etc. Further, the present invention can be also used in the monitoring of any place able to be monitored by using a picture.

As explained above, in accordance with the present invention, even when the supply of electric power is interrupted by power stoppage, the state of a monitoring area during the power stoppage can be transmitted to a master set by a video signal after the power stoppage is restored.

What is claimed is:

1. A camera for monitoring able to transmit a video signal to a master set by using power line communication, and comprising a power control section for switching operating power to power from a secondary battery when supply of electric power from a power line is monitored and is interrupted; a picture section for picking-up a static image every constant time at the interrupting time of the power line electric power; and a data storage section for storing the static image from the picture section; wherein the static image every constant time stored to said data storage section is transmitted to the master set as a monitoring terminal by using the power line communication when the power line electric power is restored.

2. The camera for monitoring according to claim 1, wherein said picture section photographs a dynamic image and the photographed dynamic image is transmitted to the master set as said monitoring terminal when the electric power is supplied from the power line.

3. The camera for monitoring according to claim 1, wherein the camera for monitoring further comprises a voice section for collecting voice information of a monitoring place, and the voice information from said voice section is transmitted to the master set as said monitoring terminal when the electric power is supplied from the power line.

4. The camera for monitoring according to claim 3, wherein said data storage section stores a dynamic image photographed by said picture section and the voice information from said voice section for a first constant time, and a previous dynamic image and voice information are transmitted to the master set for a second constant time by commands from the master set as said monitoring terminal when the electric power is supplied from the power line.

* * * * *